March 4, 1969    J. L. LAUB ETAL    3,430,834
WIRE CLAMP
Filed May 17, 1967

INVENTORS.
JOSEPH L. LAUB
MOMTAZ NOSSHI MANSOUR
BY Christie, Parker & Hale
ATTORNEYS.

United States Patent Office 3,430,834
Patented Mar. 4, 1969

3,430,834
WIRE CLAMP
Joseph L. Laub, Claremont, and Momtaz Nosshi Mansour, Duarte, Calif., assignors to Unitek Corporation, Monrovia, Calif., a corporation of California
Filed May 17, 1967, Ser. No. 639,160
U.S. Cl. 228—1               6 Claims
Int. Cl. B23k 1/06, 5/20, 3/00

ABSTRACT OF THE DISCLOSURE

A wire clamp for use in ultrasonic bonding apparatus. A flexure interconnects the arms of the clamp and an electromagnet provided between the arms of the clamp provides the force for opening or closing the jaws of the clamp against the resisting spring tension of the flexure. By reducing the friction in the clamp to a negligible amount, substantially increased control over opening and closure of the clamp jaws is obtained.

Background of the invention

This invention relates to clamping devices and in particular to a clamping device utilizing a flexure for use in ultrasonic bonding apparatus. In a typical ultrasonic bonder, wire which is to be bonded to a work piece such as solid state electronic devices and leads on printed circuit boards is fed from a spool to a location adjacent the work piece and beneath an ultrasonic bonding transducer. To enable semi-automatic wiring of the many interconnections on a typical circuit board by means of a bonding machine, mechanical clamping means are provided with the ultrasonic bonding or welding head for the purpose of advancing wire from the supply spool to the weld location and thereafter breaking the wire after the bond has been accomplished.

In the past, wire clamping advancing means have taken several forms. The usual form is a magnetically controlled wire clamp which utilizes electric current in an electromagnet to cause the clamp jaws to be opened or closed. In the closed position the clamp jaws grip the strand of wire which is passed between them. Other clamping means have operated on a vacuum principle. In this latter instance a vacuum is drawn on a tube positioned adjacent the wire causing the wire to be held or clamped at the end of the tube in the same way that mechanical jaws grip the wire.

In the form of clamp which operates on the magnetic principle such clamps have been characterized by a problem that the device tends to "snap" when energizing current is passed through the coil of the electromagnet. Instead of a smooth, controlled squeezing and releasing action as the magnetic jaws are brought to bear on the wire, the jaws open and close rapidly when force between the magnet pole pieces achieved a value sufficiently high to overcome the static friction of the clamp. This snapping action has the effect of introducing transient mechanical forces through the bonding transducer causing deformation of the wire at the weld locations. It has been found that this deformation has a serious deleterious effect on the quality of the bond and must be minimized in order to obtain satisfactory bonding.

One way in which to reduce the effect of such transients is to build the magnetic clamp and its mounting of relatively massive proportions such that the mass of the system tends to resist the acceleration of the magnetic forces and to damp out the transient forces which may be generated. Such a solution, however, is unsatisfactory in that the larger the mass of the components the slower the operation of the system.

These transient mechanical forces are also sometimes characterized as "noise" as opposed to the "signal," i.e., the ultrasonic mechanical energy which is applied by the transducer to the bond location to obtain bonding of the wire to its connection point. The present invention significantly reduces the amount of "noise" in an ultrasonic welding sequence while at the same time accomplishing this result with relatively light, high speed elements.

Summary of the invention

The present invention provides a mechanical operator for use in ultrasonic bonding apparatus comprising a clamp including a pair of elongated arms arranged to move in an opposed relationship in the plane defined by the arms. A source of electrical signals and a pair of jaws located at one end of the clamp arms are provided, the jaws being arranged to open and close on one another as said arms are moved. Flexure means is disposed between and joins the clamp arms, the flexure means being adapted to flex within its elastic limit in the plane of the clamp arms and to resist bending and torsion in a plane other than the plane of the clamp arms. Electromagnetic means attached to the clamp generate a force in opposition to a spring force exerted by the flexure means. Means for connecting the source of electrical signals to the electromagnetic means are also provided whereby the clamp jaws may intermittently grip a workpiece disposed between said jaws.

In the construction of wire clamps of the prior art, a hinge has normally been provided between the clamp arms about which the arms are adapted to pivot. Inherent in such a structure is a relatively high amount of friction embodied in the hinge. As is typical with frictional members, two types of friction must be dealt with in the operation of the members. The first is static friction present when the members are at rest with respect to each other. The second type of friction is kinetic friction, the friction which is present when the two members are sliding with respect to each other. As is well known from basic mechanics, the value of static friction is normally higher than the rolling friction.

In the operation of a hinged wire clamp such frictional forces impose the requirement that the magnetic force generated by the solenoid or other electromagnetic means for operating the clamp jaws must be sufficiently strong to overcome the static friction. Once this static friction is overcome, then a substantially lower force is required in order to sustain movement between the members until closure. Because the static friction must be overcome, an excessive amount of force is being exerted when the clamp arms are induced to move with respect to one another which causes the jaws of the clamp to open and close in a rapid, uncontrolled manner generating the transient mechanical force referred to above.

In addition to the friction problem the hinge of a prior art clamp is subject to a certain amount of "play" during its operation. In addition to the closing motion the clamp arms had a certain freedom of movement in a direction transverse to the geometric plane defined by the clamp arms, i.e., the plane in which the opening and closing motion of the arms and the jaws occurred. This transverse motion of the arms and jaws is another source of the extraneous mechanical movement which affects alignment of the various elements and detracts from the consistency and quality of the bonds.

To reduce the effect of the problems outlined above, the present invention provides an essentially frictionless pivot for a magnetic wire clamp by providing a flexure plate or leaf spring joining the clamp arms along its longitudinal axis and being arranged to bend about an axis transverse to the plane of motion of the clamp arms. By virtue of the use of a spring or flexure plate, the static-kinetic friction typical of prior art clamps is essentially eliminated thereby permitting the current in a solenoid to be very closely controlled such that the electromagnet used generates only that amount of magnetic force needed to set the clamp arms in motion. By eliminating the need to compensate for the drop in force encountered during the transition from a static to kinetic friction condition control over the operation of the clamp arms is obtained during the entire opening and closing sequences. In addition solenoid current can be varied in any manner desired to increase or decrease the rate of travel of the arms relative to one another and to stop the travel of the arms at any point between their limits of travel.

By the use of a plate as the joining member between the arms transverse motion between the two arms is substantially reduced. The tendency of a plate to resist torsion or bending in a direction other than in the plane of the clamp arms improves the alignability of the elements of a bonding apparatus.

*Description of the drawings*

These and other aspects of the invention will be more readily understood by reference to the following figures in which.

*Description of the invention*

Figure 1:
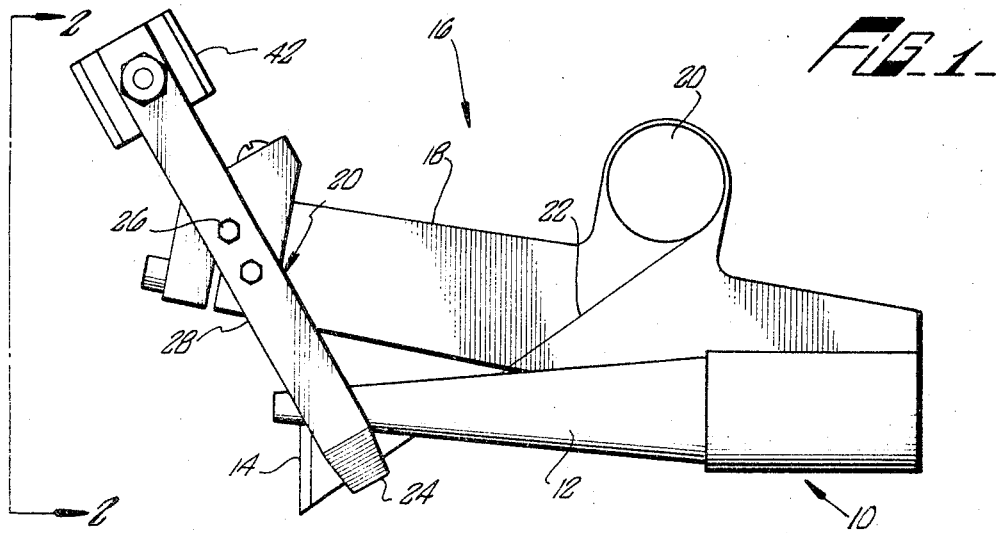
FIG. 1 is a side elevational view of an ultrasonic transducer and associated wire clamp.
Figure 2:
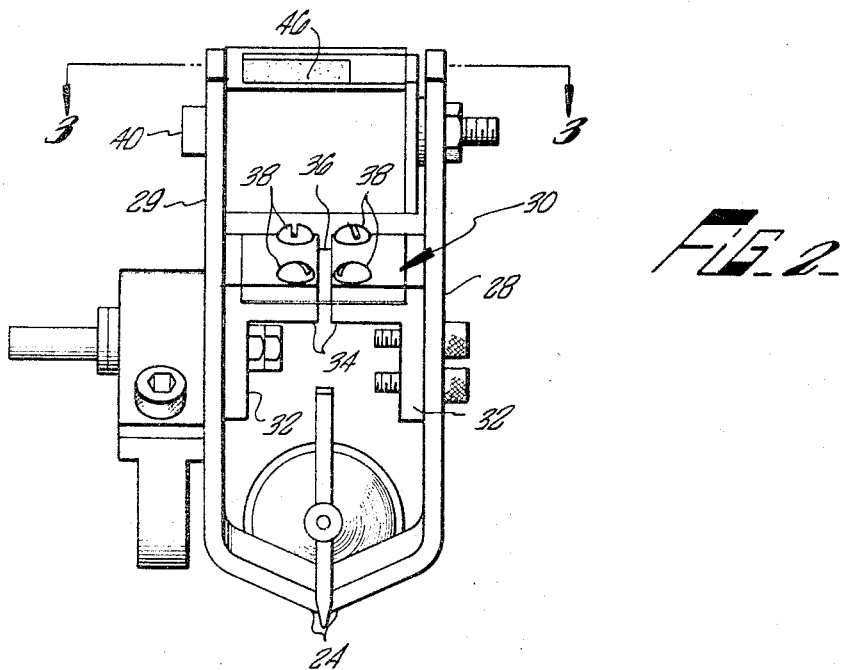
FIG. 2 is a view taken along lines 2—2 of FIG. 1.

Referring now to FIGS. 1 and 2, there is shown a portion of an ultrasonic bonding apparatus, this portion comprising a transducer 10 which includes a horn 12 and an ultrasonic welding tool 14 extending from the horn. Mounted adjacent to the transducer is a magnetic wire clamp assembly 16 comprising a support 18 and a clamp 20. Assembly 16 is also provided with a spool 20 for supplying wire 22 to be used in making connections to integrated circuit chips and the like by the action of the transducer 10. The spool 20 is mounted on assembly 16 such that the wire extends from the spool through horn 12 and between a pair of jaws 24 to the wire clamp to the base of welding tool 14. Clamp 14 is mounted on assembly 16 at a pivot point 26 and extends downwardly from point 26 such that the arms 28, 29 bracket horn 12 and terminate at one end in jaws 24 which are adapted to open and close upon and grip wire 22 extending from the spool as arms 28, 29 are moved relative to one another.

As shown in FIG. 2, a flexure 30 is connected to and extends between elongated arms 28, 29 to provide a point about which arms 28 and 29 pivot, the arms 28, 29 being arranged to move in an opposed relationship in the geometric plane defined by the arms. Flexure 30 includes a pair of base plates 32 mounted interiorly of arms 28, 29. A pair of flanges 34 extend interiorly from plates 32. A flexure plate 36 is secured to flanges 34 by means of bolts 38, the assembly being arranged in this embodiment such that plate 36 biases jaws 24 into a closed, abutting relationship with respect to each other. Provided at the end of the clamp opposite jaws 24 are electromagnetic means 40 which are adapted to generate a sufficient amount of magnetic force to overcome the spring tension of plate 36, thereby bending plate 36 within its elastic limit and opening jaws 24. Alternatively the flexure and electromagnetic means may be located on the clamp such that energization of the electromagnet produces closing of the clamp jaws.

Figure 3:
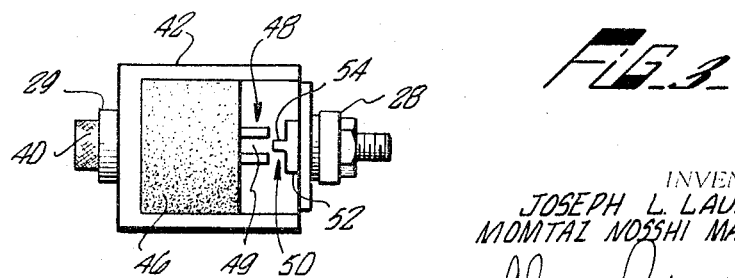
FIG. 3 is a view taken along lines 3—3 of FIG. 2.

The relationship of electromagnetic means 40 to the remaining portions of clamp 20 is best illustrated by reference to FIG. 3. As shown therein a U shaped bracket 42 is mounted on arm 29 and secured thereto by means of bolt 44. A solenoid coil 46 is mounted in bracket 42 and extending from the coil toward arm 28 is a pole piece 48 having a slot 49. Mounted on arm 28 is a shaped pole piece 50 including a plate 52 and a tongue 54. Tongue 54 is mounted on plate 52 such that it is adapted to mate with slot 49 in pole piece 48. A source of electrical signals is connected to coil 46 by wire means 58.

In operation the clamp functions in the following manner: Wire 22 is drawn from spool 20 and passed through jaws 24 to the base of welding tool 14. At this point the jaws are open to permit the drawing of wire therethrough and are held open either by means of energization of electromagnetic means 40 or by manual pressure applied against arms 28, 29 to overcome the spring tension of plate 36. When this force is released, the jaws close and grip the wire. To obtain bonding or welding of the wire to a semiconductor chip or the like, the transducer and clamp assembly are lowered so that tool 14 is brought to bear on the wire and chip. Thereafter ultrasonic energy is applied by means of the transducer through tool 14 to cause the wire to become bonded to the chip. After this first bonding step coil 46 is energized and pole piece 50 is attracted to pole piece 48 causing jaws 24 to open. The weld head and work table are then moved relative to one another to position a new point on wire 22 beneath tool 14. The tool is then lowered to cause the wire to bear against another portion of the chip or conductor material located on a support such as a printed circuit board on which the chip is mounted. Ultrasonic energy is again applied to bond the wire at this point. The coil is then de-energized and the clamp jaws close on wire 22. By pivoting clamp 20 toward horn 12 with the tool in position, bearing against the wire, the wire is pulled and "tabbed," i.e., it is broken away from the second weld location. Pivoting the clamp in the opposite direction returns the wire into position under the tool. With the repositioning of the wire the apparatus is now in condition for a repeat of the sequence of steps outlined above.

As can be seen from the steps of a typical ultrasonic bonding procedure as outlined above, the wire clamp is required to open and close upon the interconnecting wire during the bonding sequence. In the prior art devices each opening and closing of the clamp has been the source of transient mechanical forces or "noise" which are transmitted through the tool 14 to wire 22 causing deformation of the wire. Any deformation imparted to the wire other than that experienced during the "scrubbing" action of the bonding tool is undesirable because the total deformation which can be tolerated has a definite upper limit. Hence it is important that as much of the total tolerable deformation as possible be imparted by the bonding tool.

The present invention overcomes the problem of frictional hinges by providing an essentially frictionless pivot in the form of a flexure plate. In order to induce pivotal motion of the jaws only that amount of magnetic force needs to be generated by electromagnetic means to overcome the spring tension constant of the flexure. By virtue of this approach the jaws are now more slowly opened and closed and current supplied to the solenoid varied to control the rate of opening and closing. In this manner the clamp can be caused to grip and release the wire gently thereby essentially eliminating the induced transient mechanical forces and deformation previously encountered.

The controlled opening and closing of the present clamp is further enhanced by the design of the pole pieces provided with the electromagnetic means. By providing a groove and tongue arrangement a shunting effect is achieved whereby magnetic flux is shunted through tongue 56 and caused to flow in a transverse direction through each arm of pole piece 48. This shunting of magnetic flux causes equal and oppositely directed forces to be exerted in a direction transverse to the motion of the pole pieces. As the pole pieces approach each other the shunting effect is increased thereby improving the ability of the electromagnetic means to resist a tendency to snap open and close as the faces of the pole pieces approach each other.

In the preferred embodiment of the clamp of the present invention, i.e., the one in which a flexure plate is used to provide a pivot point for the clamp arms and advantage in addition to the elimination of friction is obtained. By constraining and orienting plate 36 as shown in FIG. 2, such that the plate is arranged to flex about an axis perpendicular to the plane of the clamp arms, the plate resists a tendency of the arms to move transversely with respect to one another. Consistent alignment of the tool, wire and clamp is thereby made possible improving both the quality and consistency of the bonds and the tabbing of the interconnecting wire.

In addition to causing the arms to pivot about a flexure plate, it is contemplated that the same result can be achieved by provision of extremely low friction ball bearings at the point about which the arms of the clamp pivot. Again, by virtue of the reduction of friction to a negligible amount, control of the opening and closure of the clamp is retained. As an alternative to the tongue and groove arrangement of pole faces, control over the magnetic circuit between the pole pieces can be achieved by increasing the air gap between the pole pieces.

What is claimed is:
1. A mechanical operator for use in ultrasonic bonding apparatus comprising:
   a clamp including a pair of elongated arms, at least one of said arms being arranged to move in an opposed direction relative to the other arm in the plane defined by the arms;
   a source of electrical signals;
   a pair of jaws located at one end of each of the clamp arms, said jaws being arranged to open and close with respect to one another as said arms are moved;
   flexure means disposed between and connected to the clamp arms, said flexure means being adapted to flex within its elastic limit to permit movement of the clamp arms in the plane of the clamp arms and to resist bending and torsion in a plane other than the plane of the clamp arms;
   electromagnetic means attached to the clamp, said means being adapted to generate a force in opposition to a spring tension exerted by the flexure means; and
   means interconnecting the source of signals and the electromagnetic means whereby the clamp jaws intermittently grip and release a work piece disposed between said jaws.

2. An operator according to claim 1 wherein the flexure means is located between the clamp arms for biasing the jaws into a normally closed relationship and the electromagnetic means is located between the flexure means and the ends of the arms opposite the jaws for opening the jaws upon energization thereof.

3. An operator according to claim 1 wherein the electromagnetic means is located between the clamp arms and the flexure means is located between the electromagnetic means and the ends of the arms opposite the jaws for biasing the jaws into a normally open relationship.

4. An operator according to claim 1 wherein the electromagnetic means include a pair of permeable pole pieces, said pole pieces having a mating tongue and groove relationship for creating a shunting flux path as the pole pieces approach one another when said means are energized.

5. An operator according to claim 1 wherein the electromagnetic means include a pair of permeable pole pieces having a large air gap therebetween before said electromagnetic means are energized.

6. A mechanical clamping device for use in ultrasonic bonding apparatus comprising:
   a clamp including a pair of elongated arms;
   a source of electrical signals;
   spring loaded means disposed between and joining the clamp arms, said spring loaded means defining a pivot point for movement of the arms in an opposed relationship and being adapted to pivot about an axis perpendicular to the plane of the clamp arms and to resist bending torsion in a plane other than the plane of the clamp arms;
   a pair of jaws located at one end of each of the clamp arms; said jaws being arranged to contact in abutting relation at one limit of travel of said arms;
   electromagnetic means attached to the clamp, said means being adapted to generate a force in the plane of the clamp arms in opposition to a spring tension exerted by the spring loaded means; and
   means interconnecting the source of signals and the electromagnetic means whereby the clamp jaws intermittently grip a work piece disposed between said jaws.

References Cited

UNITED STATES PATENTS 3,328,875  7/1967  Penning _____ 228—1

RICHARD H. EANES, JR., *Primary Examiner.*